United States Patent
Radziewicz et al.

(10) Patent No.: US 8,121,267 B2
(45) Date of Patent: *Feb. 21, 2012

(54) FORKED-CALL RINGBACK REPLACEMENT SYSTEM

(75) Inventors: Clifford J. Radziewicz, Hillsborough, NJ (US); Mark R. Gregorek, Mahwah, NJ (US); Jeffrey C. Dillow, Sparta, NJ (US)

(73) Assignee: eClips, Inc., Hillsborough, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/705,876

(22) Filed: Feb. 15, 2010

(65) Prior Publication Data

US 2010/0278324 A1 Nov. 4, 2010

Related U.S. Application Data

(63) Continuation-in-part of application No. 11/106,159, filed on Apr. 15, 2005, now Pat. No. 7,664,236.

(51) Int. Cl.
*H04M 1/64* (2006.01)
*H04M 3/42* (2006.01)
*H04W 4/00* (2009.01)

(52) U.S. Cl. ............... 379/88.25; 379/88.12; 379/93.12; 379/207.12; 379/912; 379/913; 455/415; 455/433; 455/567

(58) Field of Classification Search ............... 379/88.12, 379/88.21, 88.25, 93.12, 201.06, 207.12, 379/373.02, 373.03, 912, 913; 455/415, 455/432.1, 433, 567
See application file for complete search history.

(56) References Cited

U.S. PATENT DOCUMENTS

| | | | |
|---|---|---|---|
| 5,428,670 A | 6/1995 | Gregorek et al. | |
| 6,792,271 B1 | 9/2004 | Sherman et al. | |
| 6,868,268 B2 | 3/2005 | Worsham et al. | |
| 7,136,679 B2 | 11/2006 | Beauford | |
| 7,171,200 B2 | 1/2007 | No et al. | |
| 7,356,132 B1 | 4/2008 | Silver et al. | |
| 7,489,768 B1 | 2/2009 | Strietzel | |
| 7,512,421 B2 | 3/2009 | Kim et al. | |
| 2005/0101302 A1* | 5/2005 | Vogedes et al. | 455/412.2 |
| 2006/0177044 A1 | 8/2006 | O'Neil et al. | |
| 2007/0127707 A1 | 6/2007 | Koser et al. | |

* cited by examiner

*Primary Examiner* — Harry Hong
(74) *Attorney, Agent, or Firm* — Ward & Zinna, LLC

(57) ABSTRACT

A ringback replacement system for modifying or replacing certain communications network signals and tones in a roaming, forked-call, forwarded-call, or mobility environment is disclosed. Communications devices activate and interact with the ringback replacement system to allow for modification of the network service.

35 Claims, 15 Drawing Sheets

FORKED-CALL RINGBACK REPLACEMENT SYSTEM

CROSS-REFERENCE TO RELATED APPLICATIONS

This continuation-in-part application claims the benefit of co-pending Non-Provisional application Ser. No. 11/106,159, filed Apr. 15, 2005, the entire contents of which is herein incorporated by reference.

FIELD OF THE INVENTION

The invention relates generally to the customization of a communications network and, more particularly, to the customization of a communications network including replacement ringback announcements and the system for delivering replacement ringback content in a forked-call or mobility/roaming environment.

BACKGROUND OF THE INVENTION

Most conventional communications networks today, particularly existing telephone networks, provide a calling party with an audible ringback signal when an intended called network address or station line is idle and a busy signal when the intended called network address or station line is already in use (i.e., the telephone or other device at the called network address is being used). Conventional networks also provide a calling party with an audible dial tone signal when the telephone or other device at the calling station signals the network that they wish to initiate a call or network communication and a line is available. Most conventional communications networks today, particularly existing telephone networks, also provide advanced features, such as call waiting. The call-waiting feature allows a station or device already connected to another station or device to temporarily disconnect from a first call and receive a second incoming call, and then switch between the calling parties.

For example, U.S. Pat. Nos. 5,557,658, 5,428,670, and 5,321,740 to Gregorek et al., incorporated herein by reference, disclose the selective modification or replacement of at least a portion of a call progress signal, including the conventional aforementioned ringback signal, dial tone, busy signal, call-waiting signal, and call waiting idle time, with prerecorded announcements and/or audio/video programming. These announcements and/or programming provide more information to a calling party. The replacement announcements and tones can be tailored to a specific calling party and can be associated with a calling party's unique network address or telephone number.

Custom ringback announcements allow for an additional level of flexibility and personalization of a user's communications network service. To customize the system, a user of a replacement ringback system, the network provider, or a third party might wish to deliver, for example, audio/video programming, music, interactive games, jokes, personalized messages, or informational messages to a calling party to supplement and/or replace the conventional ringback tones played to the calling party. Furthermore, replacement content can be customized for a specific calling party or group of calling parties. The replacement ringback system offers a convenient and simple way to extend a caller's communication experience and takes advantage of a previously unutilized call transmission period.

In addition, replacement ringback tones and announcements offer almost limitless applications in the marketing industry. Typically, a caller experiences a rather large amount of unused idle time when waiting for a called party to answer his or her telephone. A caller may also be put on hold for several minutes while the called party answers another inbound call (e.g., a called party may place an initial caller on call-waiting or hold to answer a second inbound call). Since ringback tones can be played to all parties, regardless of the called party's or calling party's own carrier or calling transmission means (i.e., whether the caller is calling from a wireless link or land line, etc.), replacement ringback tones are an ideal medium for advertising. Substantial revenue can be gained by taking advantage of this idle time to deliver advertisements pertaining to consumer goods, products, services, etc. provided by a particular corporation or individual. Further, since communication devices are virtually ubiquitous and universally used, ringback tones have the potential to reach a large, targeted audience very quickly and efficiently. For example, businesses may use replacement ringback tones to deliver company slogans, jingles, and promotions to increase exposure and publicity.

As the adoption of the technology identified in the above-referenced application is emerging, certain drawbacks in the user interface for enabling the functionality of the application are arising. For example, a subscriber is usually required to notify the network provider in advance, if the subscriber desires a new ringback replacement association via a Short Message Service (SMS) message, email, or telephone call to the communications network's voice response system or call center. This advance notification, for example, usually contains at least the network address or addresses to be associated with the new ringback content and an identification of the desired replacement ringback content. Alternatively, a communications network may utilize a website designed to facilitate interaction with the network's ringback replacement system. After an authentication and identification process, a user of a replacement ringback website may specify new ringback content to be added to the user's ringback service via a user-friendly web interface and a series of graphical prompts and menus. The desired ringback content may be already stored on the communications network (or a third party location) or the user may select local content to be transferred to a storage location accessible by the communications network. The website may utilize standard HTTP upload functionality, File Transfer Protocol (FTP), or any other data transfer or upload mechanism to initiate the transfer of the replacement ringback content to the communications network. The network provider then makes the necessary changes to the subscriber's service to associate the appropriate network address or addresses with the desired ringback content.

Also, notification and confirmation by external means are often required to update or change the ringback content for an already-existing ringback association. For example, an exchange of emails may be required to effect the change in service, or a visit to a website may be necessary to modify replacement ringback functionality. This often inconvenient and time-consuming method of updating or adding new ringback content to a user's service discourages subscribers of a ringback replacement service from frequently modifying or adding new ringback replacement associations, thus reducing potential revenue by deterring regular and repeated ringback content purchasing and utilization.

In addition, call transfer is one of the most commonly used services in modern communications networks. When a call is transferred, handed off, or forwarded to another network service provider, replacement ringback content is usually overridden by the ringback signals of the terminating network service provider. For example, a subscriber in a mobility environment can specify calls to be forwarded in various situations. When the CFU (Call Forwarding Unconditional) service is activated, for example, all calls destined to the subscriber are forwarded to a given number, which may be inside or outside the current service provider's coverage area. In the CFB (Call Forwarding on Busy) service, calls are forwarded if the called subscriber is busy. By activating the CFNRy (Call Forwarding on No Reply) service, the subscriber can instruct calls to be forwarded after a predetermined series of unanswered ringback tones. Call forwarding for mobile/roaming subscribers may take the form of the CFNRc (Call Forwarding on Not Reachable) service. Using the CFNRc service, calls are forwarded if the subscriber is not in the coverage area of the communications network, or if the subscriber has turned his or her mobile station off. Typically, in these call forwarding situations, custom replacement ringback content is lost.

Further, as is common in the art, many communications networks contain servers, which contain multi-location identification information for subscribers of the communications network. A user participating in this multi-location feature provides potential callers with a single network address that the callers may use to reach the subscriber. The communications network server containing the multi-location identification information responds to incoming calls on the multi-location number by initiating to what is known to those skilled in the art as a forked-call. A forked-call is actually several simultaneous calls initiated by the communications network server to a predetermined number of network addresses in hope of locating the desired subscriber. For example, a forked-call may try to locate the subscriber at the subscriber's home telephone number, wireless telephone number, vacation house telephone number, and PDA network address simultaneously. The incoming caller is usually connected to the first simultaneous call that is answered, at which time all other outbound calls are typically terminated.

During a forked-call or forwarded call, each end-point is likely responding with its own ringback signaling. The communications network server initiating the forked or forwarded-call usually disregards these ringback announcements and provides its own announcement indicating that the system is attempting to locate the called subscriber. Alternatively, the communications network server may simply provide conventional ringback announcements to the calling party.

It would be advantageous if the subscribers of a ringback replacement service could choose certain custom replacement ringback announcements to be delivered to incoming callers calling on a multi-location network address regardless of which location (i.e. network service provider or device) terminates or answers the call. It would also be advantageous if the same subscribers could utilize a simple system for modifying or adding replacement ringback content to the subscriber's network service. Thus, a seamless service is needed for delivering uniform custom replacement ringback content on behalf of a subscriber across various network communication services. A system is further needed for easily customizing this service using a familiar means, such as the menu or prompt systems already integrated with a handset or station or a user-friendly web-interface.

SUMMARY OF THE INVENTION

The invention comprises a ringback replacement system for delivering replacement ringback content in a roaming, forked-call, forwarded-call, or mobility environment. The invention provides for the delivery of uniform ringback content across a user's various network communication services. Ringback content or announcements could comprise audio (e.g., music, jingles, sound effects, advertisements or promotional material, or live or prerecorded voice), video (e.g., interactive games, movie clips, video advertisements or promotional material, or live or prerecorded video), data (e.g., pictures, computer screen shots, electronic documents, spreadsheets, databases, etc.) or a combination of audio, video, and data, as well as other programming material. The invention is also directed toward a system for adding ringback associations directly from a subscriber's handset or station. Ringback associations are simple logic used to determine what ringback content is played to which incoming callers. For example, a ringback association might specify that a certain advertisement is to be played to all incoming callers calling from the "212"—New York City area code. Another ringback association might specify the playing of The Star-Spangled Banner to all incoming callers calling on July 4 of each year. In the invention, the ringback replacement system is accessed via hard or soft keys on a user's handset, an attachable keypad or keyboard, a voice-activated speech recognition module, or the like modes of access. Based on the input, the system may connect to a storage device for the subscriber to select a desired ringback announcement (for example, a video clip, music, an advertisement, an interactive game, news footage, or some other programming material). Then the subscriber either manually inputs or automatically chooses by speaking predetermined voice commands translated to common phonemes a desired network address or telephone number to be associated with the previously selected ringback announcement. As a result, the user's communications network (or a third party contracted to provide ringback services on behalf of the user's communications network) requests the ringback system to play the newly associated announcement to the calling party whenever the selected network address or telephone number calls the subscriber or the subscriber's multi-location network address. Users of the invention include any end user, such as subscribers to the network service provider, as well any originating, terminating, or intermediate network service providers themselves, and third party users, such as advertisers.

The present system is also directed to a ringback replacement system which is capable of modifying currently associated network addresses or telephone numbers with new ringback announcements (or revert to conventional tones) directly from a user's handset or station. The subscriber selects the currently associated network address or telephone number and then chooses a new replacement ringback announcement. The ringback system then plays the newly-associated announcement to the calling party whenever the calling party calls the subscriber (or the subscriber's multi-location network address) from the selected network address or telephone number. For example, a user, who knows that one of the user's frequent callers has an affinity for classical music, might update the ringback association for that frequent caller as new classical releases become available.

The present system is also directed to a ringback replacement system, which is capable of modifying currently associated network addresses or telephone numbers with new ringback announcements based on a determination of the physical location (i.e., a geographical location) of the calling and called parties' communication devices. The communications devices may include, but not limited to, wireless or wired handsets, PDAs, smartphones, computers, landline phones, VoIP software clients, iPods, iPads, Netbooks, cable or fiber TV set-top boxes, and media servers. Accordingly, the system may include a physical location determination capability (e.g., GPS, radio frequency triangulation, other processing mechanism, etc.) that may communicate with any communications device to provide information related to the physical location of the communication devices. This information related to the physical location may be provided to or from the communications devices and any communications network either directly from information provided by the communications devices, by information provided by the communications network or via a database, or via a separate remote processing system that can determine the physical location of the communications devices. Also, the physical location determination capability may be implemented in the communications devices or in the communications network.

The present system is also directed to a ringback replacement system capable of modifying not only standard call processing signals with alternate audio or video content, but may also communicate and interact with software programs resident on computer readable medium on communications devices to provide and process location-based information and corresponding ringback replacement content or additional content as determined by the subscriber to the calling telephone number (or equivalent network location), the network provider(s), third parties, or the subscriber to the called telephone number (or equivalent network location).

BRIEF DESCRIPTION OF THE DRAWINGS

A further understanding of the invention can be obtained by reference to a preferred embodiment as set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the specific methods and instrumentalities disclosed.

For a more complete understanding of the invention, reference is now made to the following drawings in which.

DETAILED DESCRIPTION

As required, a detailed illustrative embodiment of the invention is disclosed herein. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for the purposes of disclosure and to provide a basis for the claims herein, which define the scope of the invention. The following presents a detailed description of a preferred embodiment (as well as some alternative embodiments) of the invention.

Figure 1:
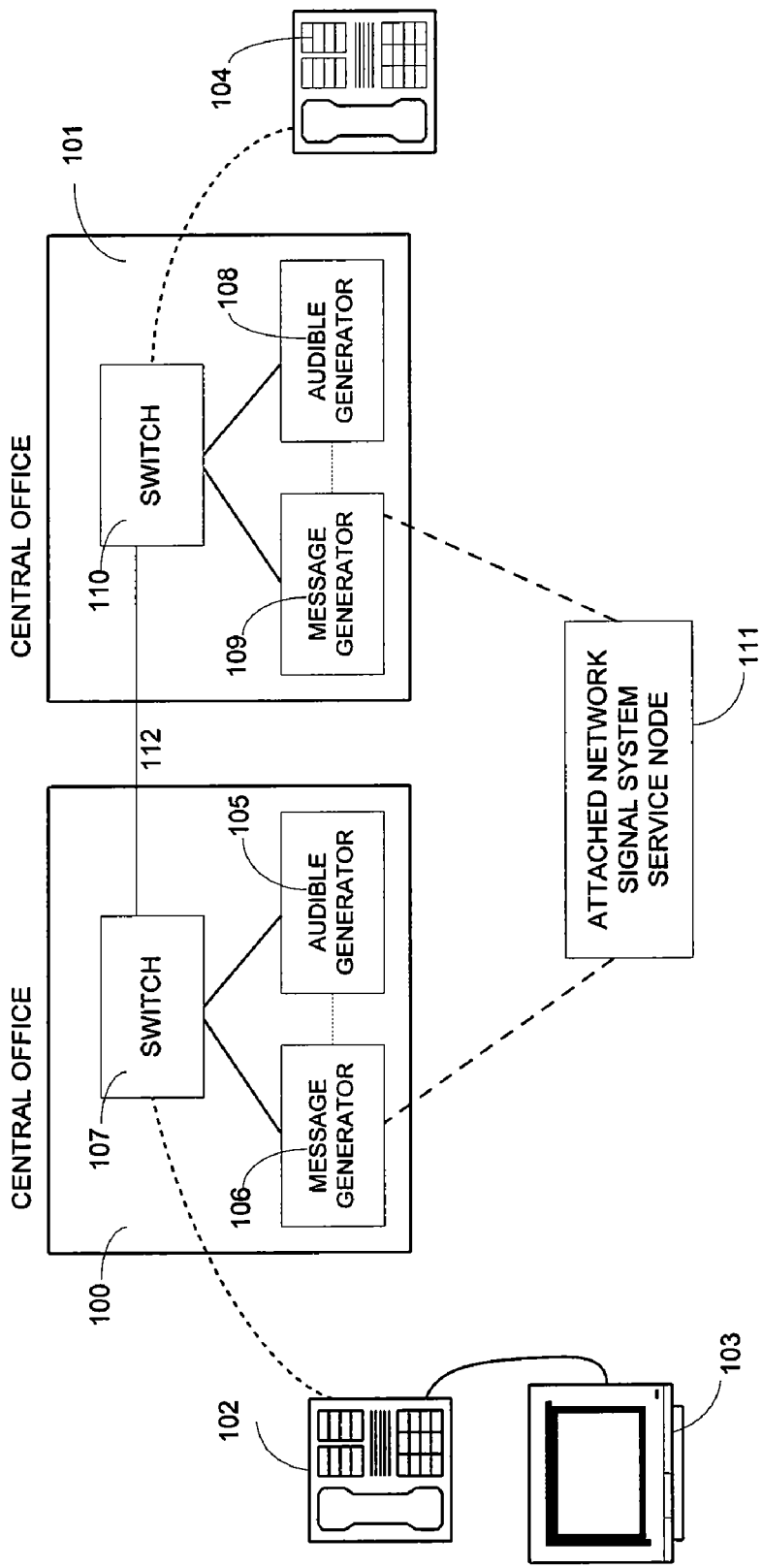
FIG. 1 (PRIOR ART) is a block diagram of a common ringback replacement system.

Referring to the drawings wherein like numerals indicate like elements throughout, there is shown in FIG. 1 (PRIOR ART) a conventional network-originated system for supplying replacement ringback content in accordance with a typical ringback control system. As is well known in the art, when a user of first telephone 102 initiates a call, a connection is formed with first switch 107 at first local central office 100, which is usually associated with a local telephone company. First switch 107 typically transmits a dial tone back to first telephone 102 to indicate the availability of the telephone service. The telephone number dialed or otherwise entered by the calling party using first telephone 102 or an associated device is transmitted to local central office 100 as a series of signals, which are detected by first switch 107. First switch 107 refers to a network control point, network controller, or communications network traffic switching and control mechanism, such as a central office or premises-based audio, data, video, or hybrid switch, a packet switch, or Asynchronous Transfer Mode (ATM) switch, or any associated signaling network control point, service control point, or service switching point or system which routes, monitors, and/or handles and controls calls over a communications network. First switch 107 is responsible for determining the destination (network address) of the call based upon the transmitted signal (i.e., the number dialed). First switch 107 transmits the call initiated by the user of first telephone 102 over communications network 112 toward an identified network address or called station, which in the present embodiment comprises second telephone 104, but could comprise any other type of communication device. The called network address or station is identified by the telephone number or network address entered by the calling party at first telephone 102. Communications network 112 could be a local exchange network, interexchange network, long distance network, international network, telecommunications network, cable television network, broadcast network, switched network, dedicated network, the Internet, Voice over IP (VoIP) network, wireless network, Wi-Fi network, WiMAX network, or a hybrid type of the foregoing networks or any network similar to the aforementioned networks.

The call from the calling party is received by second switch 110 located at second local central office 101 which determines the status of second telephone 104 (i.e., whether second telephone 104 is in a busy state or in an idle state). Attached network signaling system service node 111 can also determine the busy/idle status of the called network address or station line. The specific procedure by which second switch 110 or attached network signaling system service node 111 determines the busy/idle status of the called network address or station line is common and well-known to those skilled in the art.

Depending upon the configuration of the network, either first audible signal generator 105 and first message generator 106 or second audible signal generator 108 and second message generator 109 can transmit the call progress signals to the user of first telephone 102. For the purposes of discussion, when a user of first telephone 102 initiates a communication session with second telephone 104, second audible signal generator 108 and second message generator 109 may provide signals and/or announcements to the user of first telephone 102. Second message generator 109 is connected to second switch 110 and is capable of supplementing and/or replacing the signals generated by second audible signal generator 108. Second switch 110 or attached network signaling system service node 111 determines whether second audible signal generator 108 or second message generator 109 is activated. When a user of first telephone 102 initiates a communication session with second telephone 104, second switch 110 or attached network signaling system service node 111 activates second audible signal generator 108 to provide a conventional audible ringback signal and activates second message generator 109 to play a series of prerecorded announcements (i.e., replacement ringback content) to the user of first telephone 102. First telephone 102 may also be attached to display 103 for the transmission of video signals. It is to be understood that the signal generation functions of second audible signal generator 108 and second message generator 109 could alternatively be provided by third party or outside audible signal and message generators as required by the communications network.

In most wireless, cellular, and trunked telephone networks, upon network access the transmission of a dial tone by first switch 107 is suppressed. In addition, typically the busy/idle status of second telephone 104 determines if a caller to a wireless or cellular station is automatically transferred to a network voice mail system; if a user's communications station is busy, off-line, powered off, or cannot be located, a caller is most often redirected to a network voice mail box in lieu of the transmission of a busy signal. Message generator 109 may similarly deliver announcements to users calling wireless, cellular, or trunked stations before, after, or during any transfer to a network voice mail service.

Announcements are enabled by inserting a software subroutine into the call processing software of the network. The various mechanisms for incorporating software into the call processing system of the network are well known to those skilled in the art. The software subroutine causes call processing procedures to be modified and allows first message generator 106, second message generator 109, or a third-party message generator to become an integral part of the call completion sequence.

Second message generator 109 can also play certain messages based on the time of day, day of week, month of year, or any other time frame reference. An integrated or external clock may be synchronized with second message generator 109 for monitoring the time of day, day of week, and month of year. When a call is placed to second telephone 104 from first telephone 102, and second message generator 109 has been signaled to initiate a message sequence, the information from the clock is read by second message generator 109 and is compared to information located in a look-up table in the memory of second message generator 109 to determine which messages are to be played. For example, a user of the present system, the network provider, or a third party could specify a prerecorded video to be transmitted to a calling party calling the user from video-telephone number "212-555-1212" on January 25 of each year (the user's birthday, for example) whenever video-telephone "212-555-1212" calls the user on January 25. As another example, a user, the network provider, or a third party could specify a certain holiday music clip to be delivered to all callers calling on Christmas Day, and a different music clip to be transmitted on all other days. Second message generator 109 retrieves designated messages until second telephone 104 is answered or the calling party abandons the call. It should be appreciated that, if desired, live announcements may be provided under the control of second message generator 109.

If second message generator 109 is set to determine which announcements are to be played based upon the area code and telephone number of first telephone 102, second message generator 109 can read the telephone number of the calling party as provided by the telephone network (e.g., second message generator 109 can use an automatic number identification (ANI) system or similar identification system(s) which are well-known in the art to identify the area code, telephone number, or other characteristics of the calling party) and determine the geographical location of the calling party by matching the telephone number with a location provided by an updateable look-up table linked to second message generator 109 and maintained by the central office, an affiliate thereof, or other third party. Second message generator 109 determines which announcements are designated for a particular area code and telephone exchange and plays the appropriate prerecorded messages until second telephone 104 is answered or until the calling party abandons the call.

It should also be appreciated that the invention is not limited to traditional telephone networks (for example, PSTN or the like). With the evolution of enhanced services and the convergence of telephony with data interfaces, today's networks are increasingly merging with standard Internet protocols for signaling and media. It is now common in the art for some of these networks to allow for the separation of the signaling from the media transport. For example, an increasing number of Competitive Local Exchange Carriers (CLECs) and Internet Telephony Service Providers (ITSPs) are offering such services as local and long distance telephony, Voice over IP (VoIP), presence and instant messaging, push-to-talk, rich media conferencing, and more, based on Session Initiation Protocol (SIP). Unlike traditional telephone networks, users of SIP-based networks can locate and contact one another regardless of media content and the number of participants.

Figure 2:
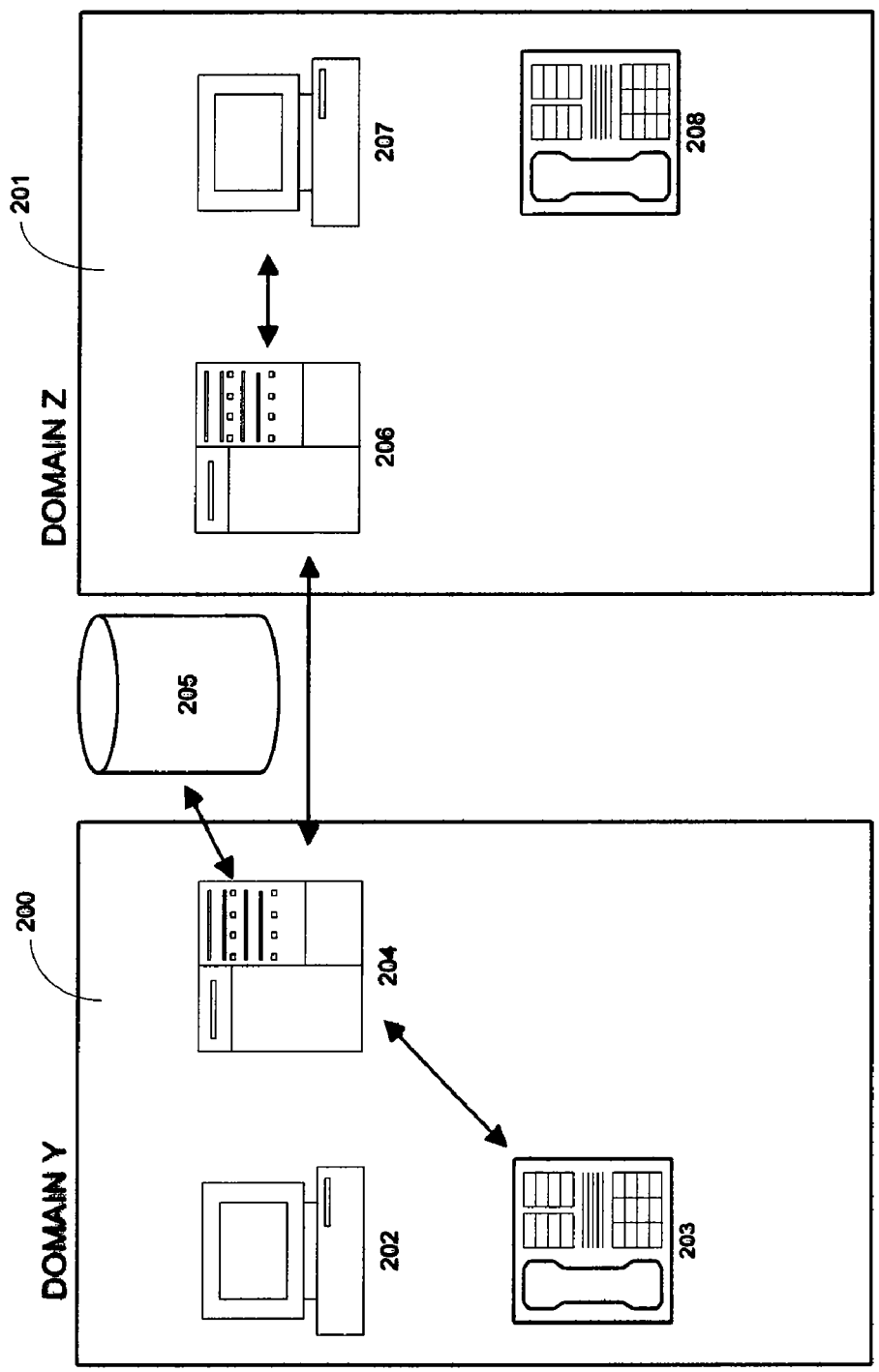
FIG. 2 is a block diagram in accordance with the handset-originated replacement ringback system of the invention.

For example, FIG. 2 illustrates the interaction between two SIP-based user agents (each with a SIP address, such as sip:user@localhost.com) while establishing a communication session in different domains. SIP user agents may be any end-user devices, such as wireless telephones, multimedia handsets (e.g., video telephones), mobile computers, PDAs, smartphones, landline phones, VoIP software clients, iPods, iPads, netbooks, cable/fiber TV set-top boxes, media servers, or any other devices capable of creating and managing SIP sessions. As illustrated in FIG. 2, user agents 202 and 203 are located within first domain 200 and user agents 207 and 208 are located within second domain 201. User agent 203 within first domain 200, in attempting to establish a communication session with user agent 207 located in second domain 201, first contacts SIP proxy server 204 located within first domain 200 of user agent 203. SIP proxy server 204 may be any packet switch, proxy server, gateway, service control point, soft switch, call controller, or other like structure. SIP proxy server 204 recognizes that user agent 207 is outside its own domain and contacts SIP redirect server 205 for the network address of user agent 207. SIP redirect server 205 may be located in either first domain 200 or second domain 201 (or both domains) and responds to the proxy server's request with user agent's 207 contact information (e.g., current IPv4 or IPv6 address). This contact information may include multi-location information or the contact information for more than one user agent. If the contact information received from SIP redirect server 205 contains multi-location information, SIP proxy server 204 may attempt to locate the called user across the user's various network communication services identified by the multi-location information, such as the user's PDA, multimedia handset, wireless telephone, and mobile computer. SIP proxy server 204 forwards a session invitation to SIP proxy server 206 located in domain 201 identified by the contact information received from SIP redirect server 205. The invitation may include a session description (perhaps written in Session Description Protocol (SDP) format) that provides the called party with enough information to join the session. For multicast sessions, the session description enumerates the media types and formats that are allowed to be distributed to that session. For a unicast session, the session description enumerates the media types and formats that user agent 203 is willing to use and the desired location to send the media data.

Next, SIP proxy server 206 delivers the session invitation to user agent 207. If the session invitation is acceptable to user agent 207, user agent 207 creates an acknowledgment reply and forwards the reply back to SIP proxy server 206. Finally, SIP proxy server 206 forwards the acknowledgment back to SIP proxy server 204 located in first domain 200. SIP proxy server 204 then relays the acknowledgment back to the initiating user agent 203. User agents 203 and 207 may then create a point-to-point communication connection (e.g., using Real-Time Transport Protocol (RTP) or any other protocol or delivery method supported by user agents 203 and 207) enabling the two user agents to interact. Once a point-to-point connection is established, replacement ringback announcements may be delivered to user agent 203 from a variety of sources. For example, replacement ringback announcements may be delivered directly from user agent 207 when the underlying protocol signals user agent 207 to deliver its ringback announcement. Alternatively, replacement ringback announcements may be delivered to user agent 203 on behalf of user agent 207 from a network server, application server, media server, dedicated ringback server, or from a third-party server.

Figure 3:
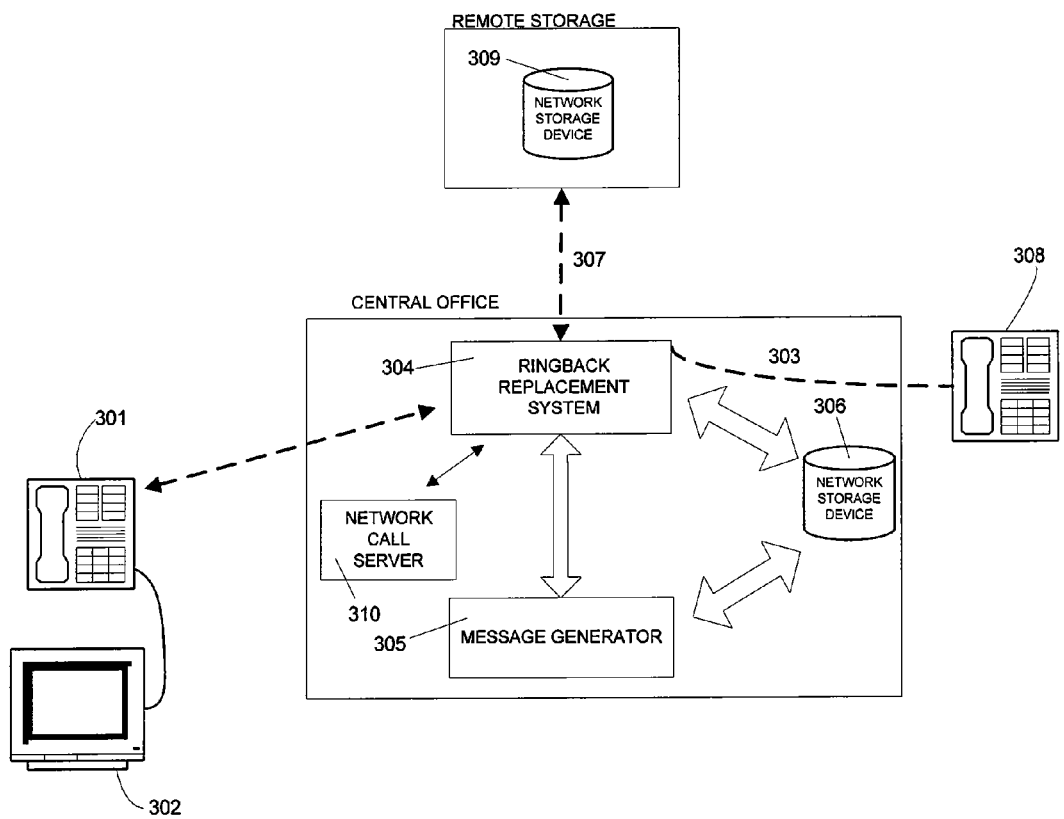
FIG. 3 is a block diagram in accordance with the network-originated replacement ringback system of the invention.

Now referring to FIG. 3, a schematic block diagram of a network-originated ringback replacement system is shown in accordance with the preferred embodiment of the invention. The invention is designed for use with any type of communications network including any network capable of transmitting voice, data, video, multimedia, real time, store and forward, interactive, hybrid types of information, or other similar information services. The communications network may be provided by a private or publicly-owned local exchange, interexchange, long distance, international, telecommunications, cable television, broadcast, switched, dedicated, wireless, Voice over IP (VoIP), Wi-Fi, WiMAX, hybrid types of network providers, or other like networks. The communications network provided by these network providers may utilize wireless, facilities-based, satellite-based, hybrid types of transmission schemes and/or mechanisms, or other systems of similar function. For the sake of brevity and simplicity, the embodiments of the invention illustrated in the figures are specifically directed to a standard or typical telephone system used for providing voice communication between two individual network addresses (e.g., in the present embodiment, these network addresses correlate to telephone stations or telephones). However, it should be clearly understood by those skilled in the art from this disclosure that the invention is not limited to access from such standard telephone stations or to telephone station communications systems, and may include, other communications devices. In addition, while in the described embodiment one or both of the telephone stations are illustrated as being typical or standard telephone instruments, the terms "station" and "handset" could refer to any device or object which may be connected to or be an integral part of a communications network. A communications network may allow for the initiation, receipt, and/or interaction of audio and/or visual information. This information may include voice, data, video, multimedia, real-time, store and forward, interactive or hybrid types of information. It should also be clearly understood that the terms "station" and "handset" should be read to include, but not be limited to, devices such as wireless or cellular telephones, personal digital assistants, digital personal organizers, televisions, video monitors, video telephones, computers, television set-top converters, modems, video servers, front end processors, other communications networks, and combinations or hybrids thereof.

Still referring to FIG. 3, ringback replacement system 304 is in communication with network storage device 306, remote network storage device 309, and message generator 305. As is common in the art, network storage device 306 and remote network storage device 309 maintain the ringback replacement content on behalf of the subscribers of the service in indexed files. Although network storage device 306 is depicted as an internal central office device, it is contemplated that network storage device 306 may be external to the central office. It should be appreciated that if the communications network is a packet-based network (e.g., the Internet, WAN, LAN, VoIP, or virtual private network) or a point-to-point network, storage device 306 may be internal to called telephone 308 and certain functionality common to a switched-environment central office may be delegated to the handset device. As also known in the art, each file of ringback replacement content can be accessed by a unique identification number or name, assigned either by the communications service provider or by network storage device 306. By pressing a hard, soft, or touch key on called telephone 308, or through the use of an attachable input instrument or voice recognition module (or like device), called telephone 308 connects to the ringback replacement system 304 through communication link 303 available to called telephone 308. Communication link 303 may comprise a portion of the main communications network accessible by called telephone 308, or may be a supplemental, peripheral, or ad-hoc network designed primarily for accessing ringback replacement system 304. In the preferred embodiment, communication link 303 is a wireless link, comprising part of a Cellular Digital Packet Data (CDPD), High Speed Circuit Switched Data (HSCSD), Packet Data Cellular (PDC), Time Division Multiple Access (TDMA), Code Division Multiple Access (CDMA), 1xRTT, Global System for Mobile Communications (GSM), General Packet Radio Service (GPRS), Bluetooth, Wi-Fi, WiMAX, 2G, 3G, Local Multipoint Distribution Service (LMDS), Multichannel Multipoint Distribution Service (MMDS), or other wireless network, including protocols not yet implemented, utilizing Wireless Application Protocol (WAP) or the equivalent thereof. It will also be appreciated by those skilled in the art that communication link 303 could comprise a portion of any wired or wireless communications network over any communication or network protocol designed for data transmission.

Calling telephone 301 could also be connected to (or comprise an integrated) video display unit 302, such as a computer terminal, video terminal, LCD screen, LED display, plasma display, telephone monitor, or matrix display for the transmission of video signals. It is to be understood by those skilled in the art that ringback replacement system 304 is not limited to access from a conventional wireless telephone device. For example, the ringback replacement system 304 can be accessed from any state of the art communications device, including web-enabled wireless telephones, video telephones, mobile and desktop computers, and digital personal assistants or hybrid devices with telephony or communications capabilities.

Ringback replacement system 304 is also in communication with network call server 310 that provides forwarded and forked-call functionality on behalf of subscribers of the communications network. Network call server 310 may comprise any network control point, proxy server, telephony server, network controller, communications network traffic switching and control mechanism, signaling network control point, service control point, or service switching point or system, which handles, places, or controls calls over a communications network. In packet-based, VoIP, or like networks, the functionality of network call server 310 may be embedded in calling telephone 301. When calling telephone 301 attempts to communicate with called telephone 308, network call server 310 may attempt to locate the called party across various network communication services by placing a forked-call or a series of forwarded calls. Network call server 310 providing the forwarded or forked-call functionality negotiates with ringback replacement system 304 to provide uniform replacement ringback content regardless of which location or device answers the call.

Ringback replacement system 304 monitors all call initiation requests with called telephone 308. When calling telephone 301 attempts to initiate communication with called telephone 308, ringback replacement system 304 analyzes the incoming station identification. As is common in the art, incoming station identification is specific to the underlying communications network and can include a network address (e.g., an IP address), a Uniform Resource Locator (URL), a telephone number obtained from "caller ID" or automatic number identification (ANI), or any other station identifying means capable of being ascertained by the communications network or called telephone 308. For example, SIP signaling messages, Q.931 signaling messages, or packet headers might be analyzed for calling party address information. Simple logic within ringback replacement system 304 compares this incoming identification information with all the replacement ringback associations created by the user of called telephone 308, the network provider, or a third party. If an association matches an incoming network address or telephone number, message generator 305 plays the appropriate replacement ringback content to calling telephone 301 while network call server 310 initiates a forward or forked-call to locate the user of called telephone 308 until called telephone 308 is answered or calling telephone 301 abandons the call.

In another embodiment, ringback replacement system 304 may include a capability to determine the physical location of a communications device (for example, calling telephone 301 and called telephone 308), such as, in one non-limiting embodiment, GPS, radio frequency triangulation, or other similar types of location determination capability in order to determine the location of communication devices within any network. As such, the system may communicate and provide location-related information to any communications device from any communications network and also communicate location related information from any communications device to any communications network. The system 304 may process and communicate this information by receiving location information directly from the communications devices or by receiving information from any communications network that is associated with the communications devices. In other embodiments, a separate database or processing system (not shown) is utilized to transmit information in order to determine the physical location of the communications devices on a plurality of communications network. The physical location determination capability may be implemented within the communications network or within the communications devices. It should be appreciated that the communications devices may include but are not limited to wireless or wired handsets, PDAs, smartphones, computers, landline phones, VoIP software clients, iPods, iPads, netbooks, cable/fiber TV set-top boxes, media servers, or other similar types of devices.

The ringback replacement system 304 may not only replace standard call processing signals with alternate audio or video content, but may also communicate and interact with software programs residing in a computer-readable medium on these communications devices to provide and process location-based information of the communications devices and corresponding ringback replacement content or other replacement content as determined by the subscriber to the calling telephone number (or equivalent network location), the network provider(s), third parties, or the subscriber to the called telephone number (or equivalent network location).

In one example, if a calling party associated with a calling telephone 301 establishes a communication session from the corner of 42nd Street and 8th Avenue in NYC with a called party associated with called telephone 308, the calling party may hear an advertisement, receive a text message or an email containing a coupon code or similar promotional content for a coffee location within the proximity of the calling party in lieu of a busy or a ringback signal or a ringback tone. The ringback replacement system 304 provides this information after the system 304 determines the location of the calling party through GPS, RF triangulation, etc and cross-checks this location information against a sponsorship database and has determines that a certain coffee location is located within a certain proximity to the calling party. In another embodiment, the calling party may pre-register with calling party's service provider requesting to receive promotions via text message or email from the certain coffee location when appropriate.

In another example, the calling party associated with a calling telephone 301 may try to establish a communications sessions from the corner of 42nd Street and 8th Avenue in NYC, and during the time that the calling party would normally receive a busy or a ringback signal or a ringback tone, the calling party instead may hear an announcement or see a visual cue in the calling party's communication device's screen-based application, such as a dropping pin icon or receive a text message or email that the called party's subscriber's phone 308 is located at 33rd and 7th Avenue in NYC. The ringback replacement system 304 provides this information after the system 304 determines the location of the called party's communication device 308 through GPS, RF triangulation, etc and has determined that the calling subscriber has requested to be notified of the called party's location whenever that information is available. In another embodiment, the system 304 could initiate a map application on the calling party's telephone 301, and additionally a map application on the called party's telephone 308 during the ringback cycle, or send a text message or send an email providing the current location of both parties, as well as the distance separating the two parties. Alternatively and additionally, the system could initiate a map application on one or both of the communication devices related to mass transit, which would show the nearest subway station and identify the subway line that either party could use to go to meet the other party.

Figure 4:
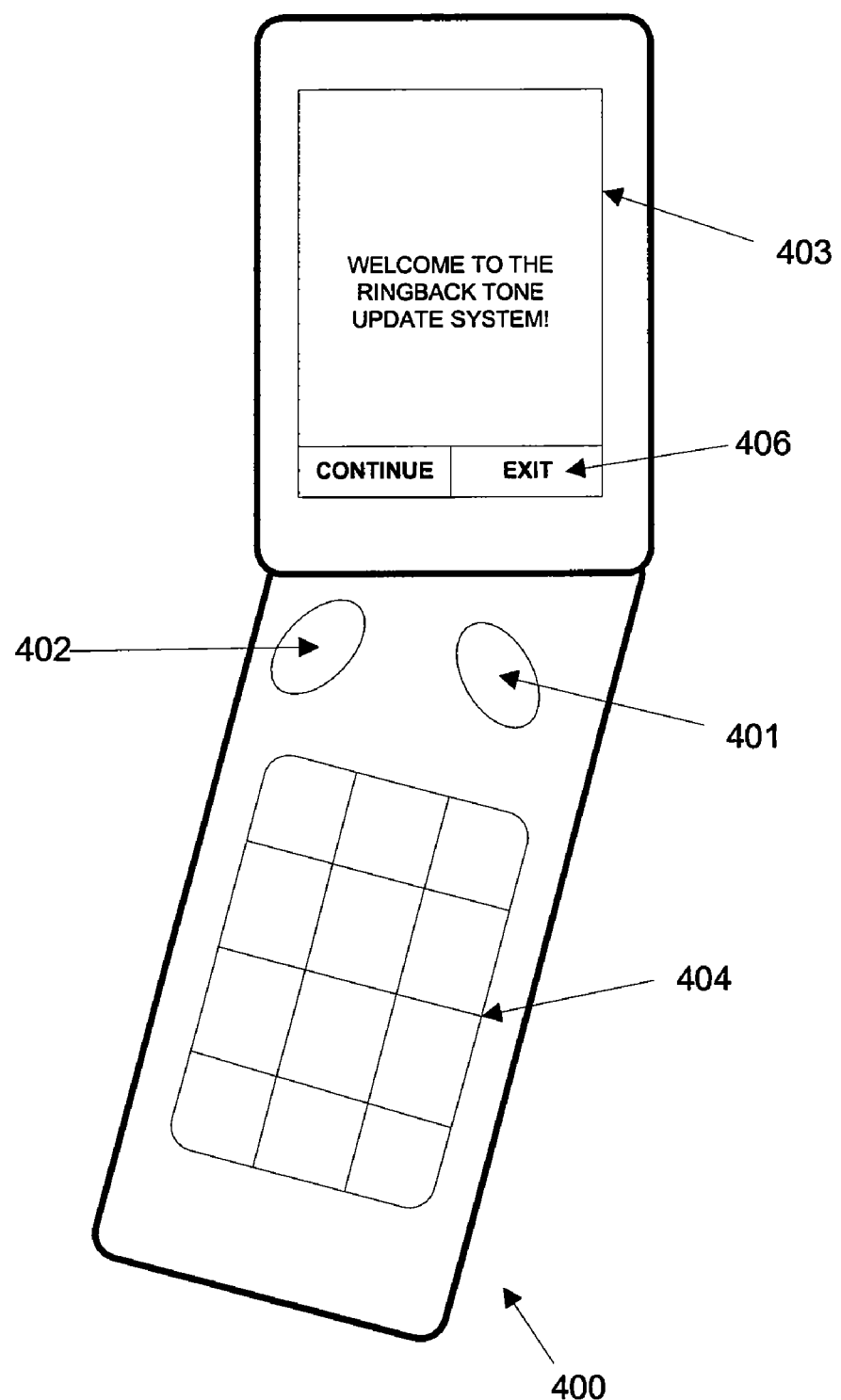
FIG. 4 depicts a wireless telephone with a display and hard, soft, and touch keys used to activate and interact with the replacement ringback system.

As shown in FIG. 4, depicted is wireless telephone 400 with integrated display 403 used in accordance with the preferred embodiment of the present system. Integrated display 403 can be a liquid crystal, LED, plasma, active-matrix, flat-panel, or any other display or device used to display information to a user, such as output video or graphical signals. Integrated display 403 can further comprise a touch screen. In this scenario, the ringback system may be accessed by a user touching a pen or stylus to the appropriate touch buttons 406 on the touch screen. Navigation and data entry are also supported via touch buttons preferably positioned on integrated display 403. Alternatively, the user accesses the ringback system by utilizing soft keys 401 or hard keys 402 integrated within or positioned local to keypad 404. Wireless telephone 400 may also include a secondary attachable keypad or keyboard that facilitates access to and use of the ringback system. In addition to using hard, soft, touch, or attachable keys, a user of the ringback system may use a voice recognition module integrated within wireless telephone 400 to access, navigate, and input selections into the replacement ringback system. As is well known in the art, speech recognition may be used to dial telephone numbers, access applications and features, navigate screens, and input data. With the use of voice recognition, a user may access and control the present system without the use of a traditional input device; however, a combination of the input systems and methods may be utilized.

Figure 5:
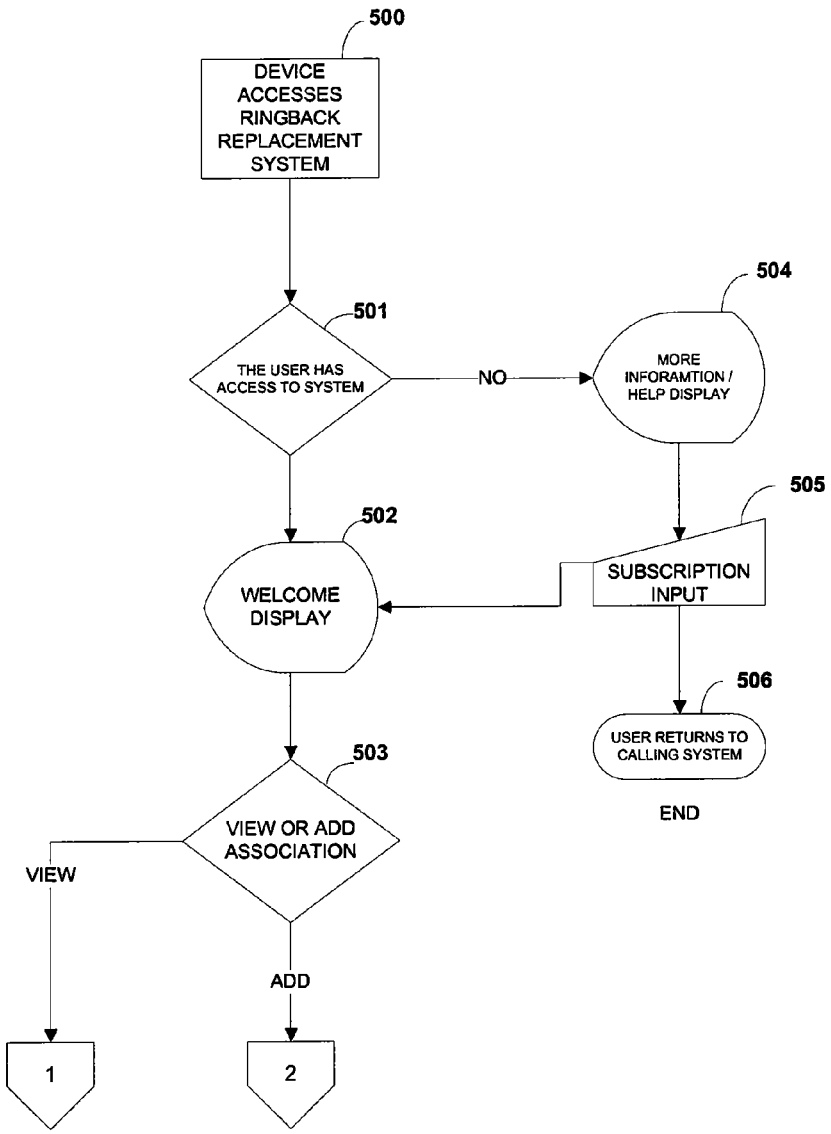
FIG. 5 is a flow diagram illustrating the initial interaction between a user and the replacement ringback system.

Now referring to FIG. 5, a flowchart of the preferred embodiment of the invention is shown depicting the interaction between a user and the ringback replacement system. A user, the network provider, or a third party accesses the replacement ringback system 500 using one of the access methods described above. The first step of interaction between the user and the ringback replacement system is authorization routine 501, which verifies the current status of the user. Within authorization routine 501, user status is confirmed and verified to determine if access to the ringback system should be granted. For example, if the user is not currently authorized to use the ringback system, the user may be required to subscribe to the ringback service. If the user is unauthorized, authorization routine 501 presents the user with help screen 504. Help screen 504 prompts the user to verify or confirm that subscription to the ringback service is desired. If subscription to the service is requested, the user may be required to input billing information or personal identifying information, such as a password, PIN, or social security or account number, at subscription input stage 505 in order to complete subscription to the ringback service. Data is provided to the system through hard, soft, attachable, or touch keys, or via voice recognition. If the subscription process does not complete successfully, or if the user chooses to cancel the subscription process, the user is returned to the calling system at exit stage 506.

In addition, if the user's account is determined to be presently delinquent, authorization stage 501 requests the user to provide immediate payment information via help screen 504 and subscription input stage 505 in order to bring the user's account into good standing. This may be achieved by authorizing an automatic one-time debit of the user's credit or checking account linked with the user's account, or by presenting the user with subscription input screen 505 so that the user might type, touch, or speak the user's billing information into the system. If the user's account is not determined to be in good standing at the conclusion of subscription input screen 505, the user is returned to the calling system at stage 506.

On the other hand, an authorized user, or a user who has presently become authorized or subscribed, is presented with welcome display 502 indicating that the user has successfully activated the ringback replacement system. Welcome display 502 may additionally be supplemented to display targeted content to the user accessing the ringback replacement system. The targeted content may be selected based on the current location of the user accessing the system (determined by the user's network address or telephone number or through physical location determination, such as GPS, radio frequency triangulation, or other processing mechanism), or targeted content may be determined based on user-supplied or user-derived interests. For example, a user accessing the system from a New York City area code might be presented with local advertising, music, news, or information important to New York City residents or visitors or the system may present the user with advertisements or promotional materials from a local business within a narrower geographical location that the user is located because the system has determined the location of the user through GPS, radio frequency triangulation, or other similar types of location determination and has cross-checked that information against a sponsorship database to determine that the local business is located within a certain radius from the location of the user. In another example, a user who has expressed an interest in outdoor cycling via an online survey might receive content regarding bicycles and related supplies at welcome display 502. Additionally, welcome display 502 might alert the user to new replacement ringback content available on the network since the user last accessed the system. The ringback system includes logic for determining a genre or category of content preferred by the current user (based on previous content selections or user-supplied information) and automatically alerts the user to new content matching the user's interests. At view or add association stage 503, the user next chooses whether to view or add a ringback association. In one embodiment, the user enters the appropriate key (e.g., selects "1") to view or update a ringback association, and the user enters a distinct appropriate key (e.g., selects "2") to add a new association. In another embodiment, at view or add association stage 503 the user presses a soft key on the user's handset to highlight and select "CHANGE" or "ADD" on the station's integrated display.

Figure 6:
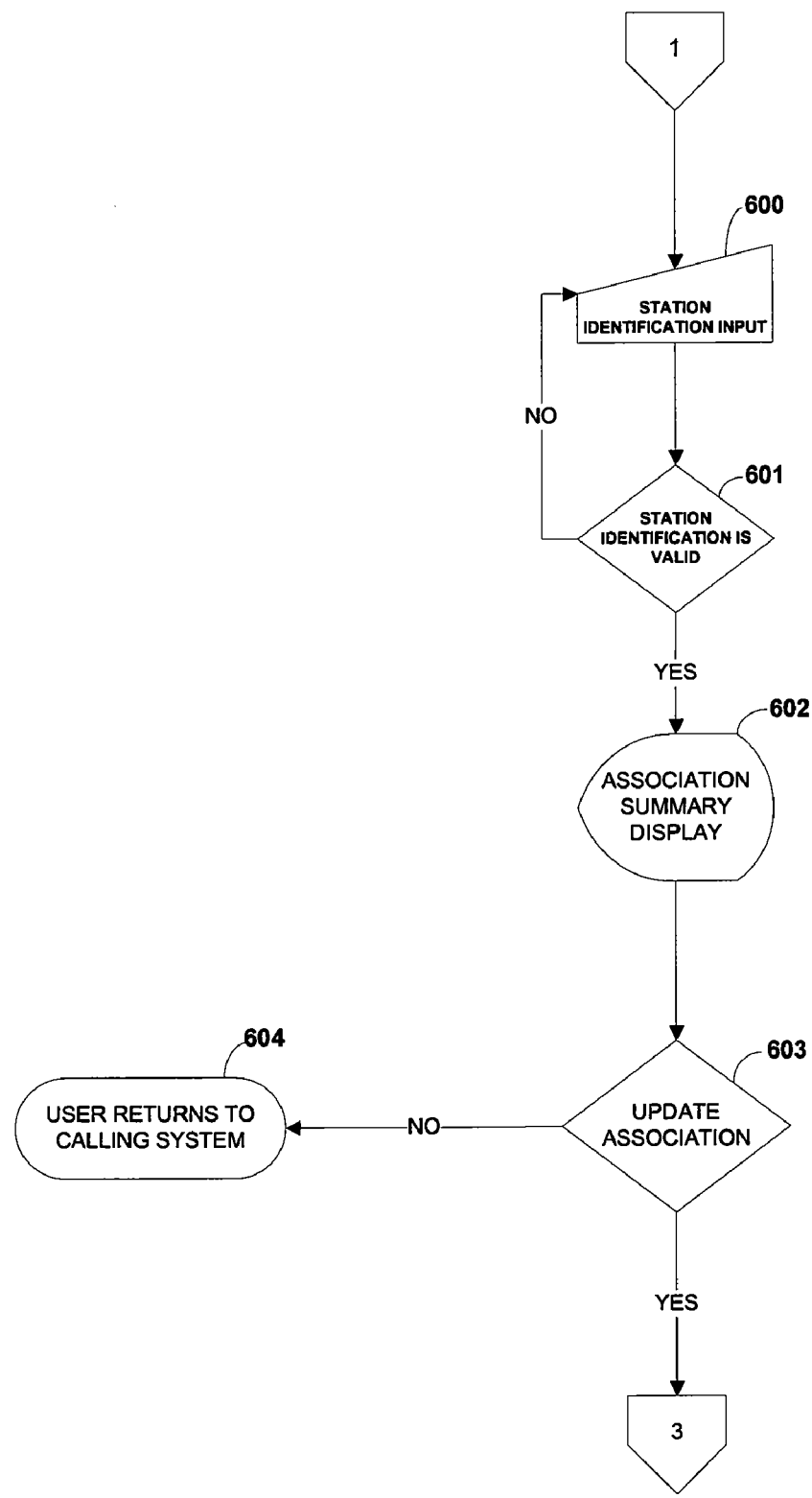
FIG. 6 is a flow diagram illustrating the interaction between a user and the replacement ringback system for viewing a ringback association.

To view or update a replacement ringback association, the user follows the interaction depicted in FIG. 6. First, the user enters the desired calling station identification at station identification input 600. The system verifies the inputted identification at station validation stage 601, and if a valid identification is entered, the system presents a summary display 602 of the association with the specified calling station identification. If an invalid station identification is entered, the user is returned to station identification input 600 until a valid station identification is entered. Once the summary display 602 is presented to the user, the user can select to exit the system or update the association at update association stage 603. If the user chooses not to update the association, the system returns the user to the calling system at exit stage 604.

Figure 7:
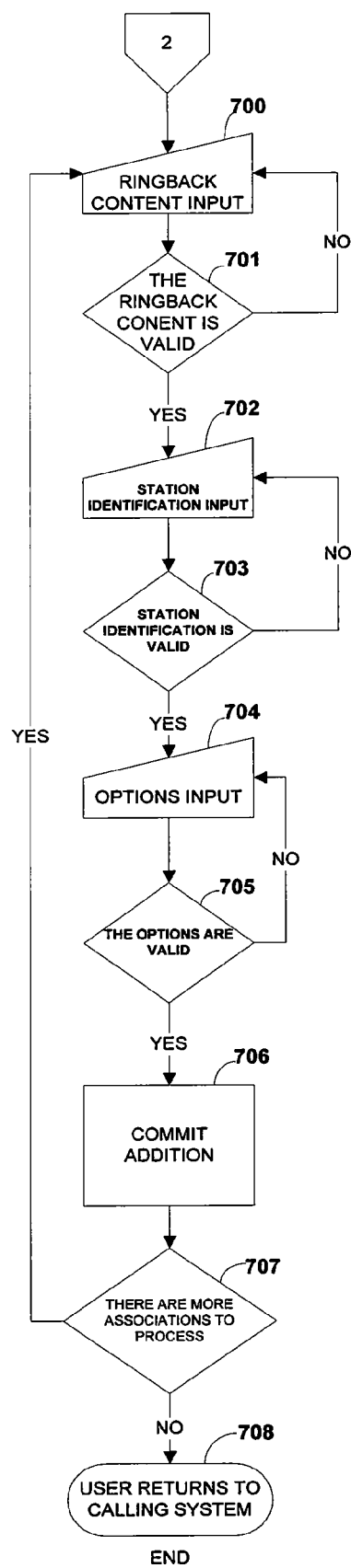
FIG. 7 is a flow diagram illustrating the interaction between a user and the replacement ringback system for adding a new ringback association.

To add a new ringback replacement association, the user follows the interaction depicted in FIG. 7. The user first enters a unique alphanumeric corresponding to the desired ringback announcement at ringback content input 700. Unique ringback alphanumeric codes can be accessible through numerous sources. For example, ringback alphanumeric codes may be published on the communications network's website or the codes could be periodically downloaded to a file on the user's handset. In one embodiment, unique alphanumeric identification codes corresponding to available ringback content are cached in a file on the user's handset. In an alternate embodiment, the system directly queries the communications network for its list of available ringback announcements stored on the network. If the ringback announcement alphanumeric identification codes are cached on the handset in a file, this file may contain the title and the identification alphanumeric of each ringback announcement stored on the network provider's storage device(s). In addition, a short description of the ringback content and its genre are included, if available. The user looks up the desired replacement ringback announcement in the file and inputs the identification alphanumeric corresponding to the desired announcement. If the user desires to remove an association, the user enters the null ringback identification alphanumeric at ringback content input 700 (e.g., the user selects "0"). The null announcement erases an association and reverts the caller's ringback tone to the conventional tone.

At ringback content input 700, the ringback replacement system also includes a search feature to assist the user in finding the correct ringback identification alphanumeric based on the first few letters of the title, genre, or artist of the content. For example, a user entering the letters "REGG" into the search engine might match the "reggae" musical genre, causing the ringback replacement system to display a list of all musical content in the reggae genre available on the network to be used as ringback content. Next, the identification alphanumeric is verified by the system at ringback content validation stage 601. Valid identification alphanumerics consist of all the existing and available ringback announcements on the communications network or the null announcement (for reverting to conventional tones). If an invalid ringback identification is entered, the user repeats ringback content input 700 until a valid identification alphanumeric is entered. After a valid ringback identification is selected, the user next enters the station identification of the calling party that the user wishes to associate with the ringback announcement at station identification input 702. The user may enter a wildcard character (e.g., the number 0) to match all network addresses. Station verification stage 703 verifies that the station identification entered is valid, and the system proceeds to options input 704. If an invalid station identification is entered, the user returns to station identification input 702 until a valid identification is entered. At options input stage 704, the user inputs optional parameters, including a time reference (e.g., the time of day, day of week, day of month, or month of year), for the delivery of the replacement ringback content. Options verification stage 705 checks the configured parameters for correct syntax and commit stage 706 commits the new replacement ringback association to the communications network. Thus, the replacement ringback addition may be added to the system in real-time, or, alternatively, if desired, the associations may be cached by the network for bulk additions at a later time. If the new ringback association specifies a network address that is already associated with a replacement ringback announcement, the new association takes precedence and overwrites the previous association. Lastly, a message is presented to the user at more associations to process stage 707 inquiring if there are more ringback associations to process. An affirmative answer at more associations to process stage 707 restarts the entire process at ringback content input 700 whereas a negative answer at more associations to process stage 707 exits the ringback replacement system and returns the user to the calling system at exit stage 708.

Figure 8:
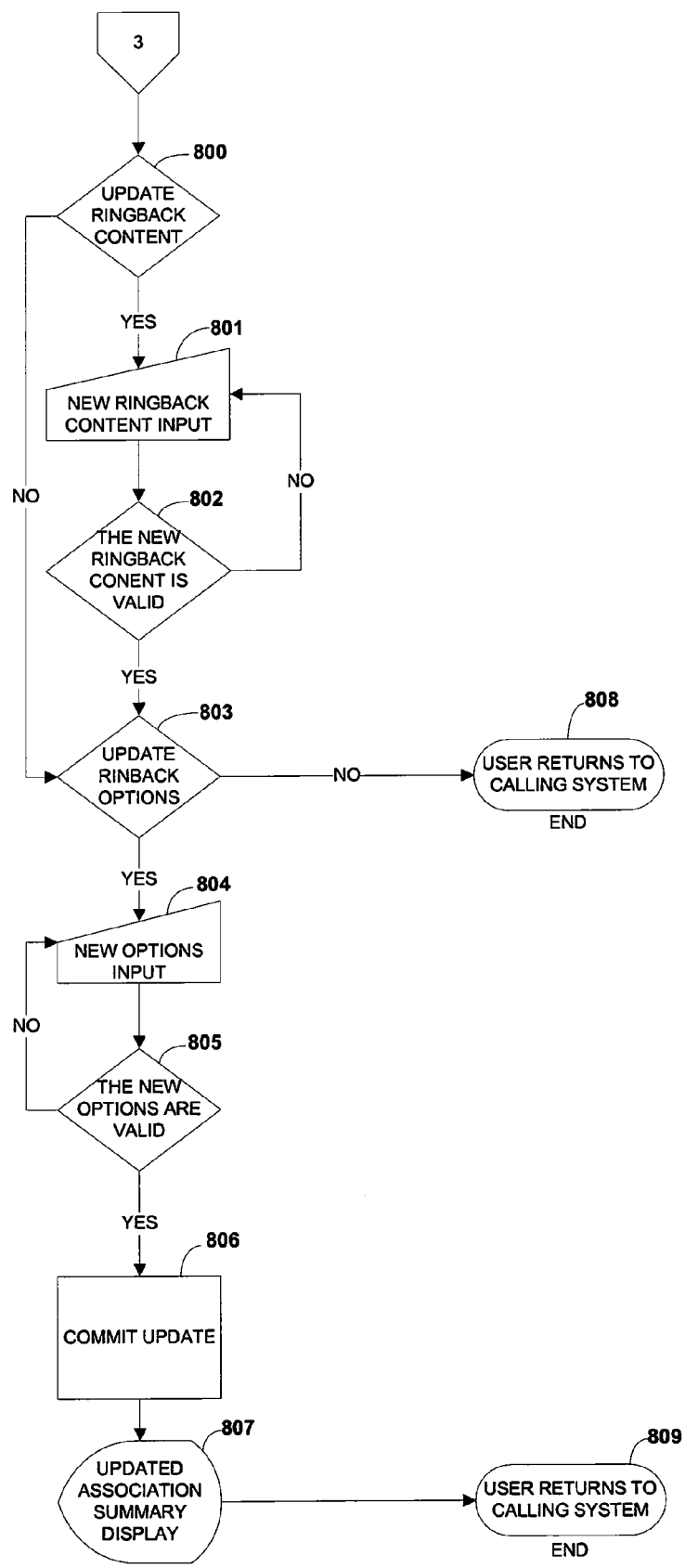
FIG. 8 is a flow diagram illustrating the interaction between a user and the replacement ringback system for modifying an already existing ringback association.

If modifications are desired, the user's interaction with the system is depicted in FIG. 8. First, the user decides at update ringback content stage 800 whether the ringback announcement is to be updated. An affirmative answer at update ringback content stage 800 brings the user to the ringback identification input stage 801. The ringback identification is validated at ringback validation stage 802, and the user is presented with options update stage 803. The system also brings the user to options update stage 803 if a negative answer is received at update ringback content stage 800. At options update stage 803, if the user chooses not to process changes to the options of the association, then the user is brought to commit stage 806. If modifications to the options are desired, the user inputs these modifications at options input 804. The options are checked for appropriate syntax at options validation 805, and the options are committed to the communications network at commit stage 806. A summary display shows the updated association at summary display 807, and the user is returned to the calling system at exit stage 809.

Figure 9:
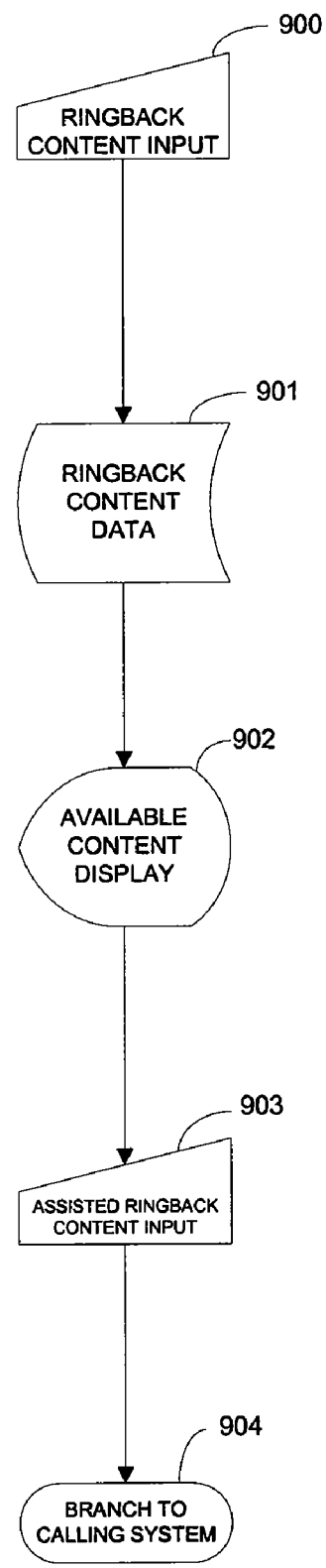
FIG. 9 is a flow diagram illustrating the interaction between a user and the replacement ringback system for displaying all ringback content available on the network.

In an alternative embodiment of the invention depicted in FIG. 9, the user at ringback content input 900 is presented with a menu of available ringback announcements to facilitate entry of ringback identification alphanumeric codes. These available announcements may be locally stored on the user's handset or station or stored within the communications network or on a third party or network storage device. Ringback content input 900 connects to ringback content data 901, which could be stored locally within the communications network (e.g., in a database or file) or an external device may be queried to retrieve available ringback content data. The data is formatted and presented to the user in user-friendly available content display 902. For example, the handset or station may have an integrated menu or list system for displaying lists of information. The user, the network provider, or a third party navigates through the list using hard, soft, or attachable keys (or via voice recognition), and the user highlights the desired ringback content. Assisted ringback content input 903 transfers the content identification alphanumeric corresponding to the selected ringback content to the ringback replacement system in lieu of manually entering the alphanumeric. The user is returned to the calling system at branch stage 904.

Figure 10:
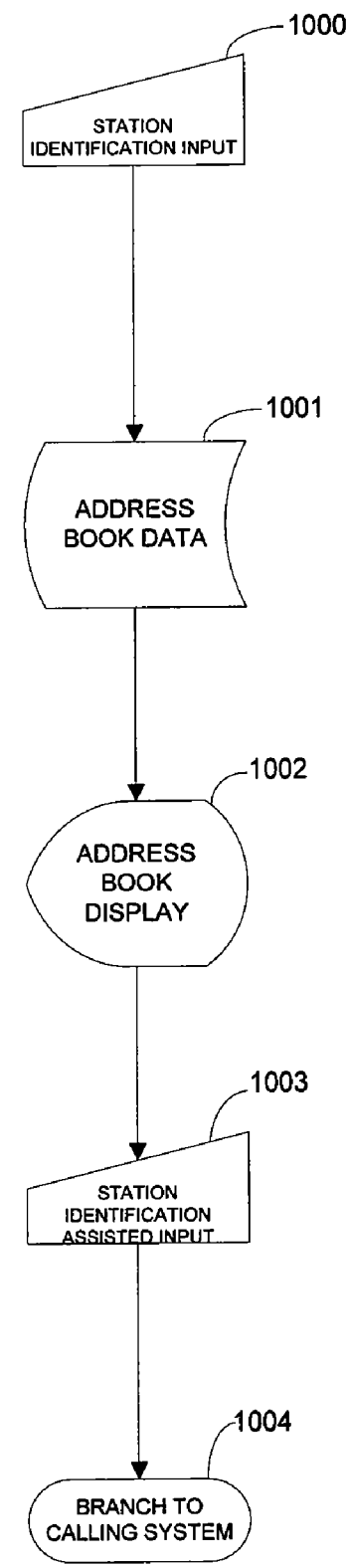
FIG. 10 is a flow diagram illustrating the interaction between a user and the replacement ringback system for displaying all network addresses stored on the user's station.

In another embodiment of the invention depicted in FIG. 10, the ringback replacement system links to the user's electronic address book to facilitate inputting network addresses. At station identification input 1000, the user is presented with the address book stored on the handset or station that is accessing the ringback replacement system. Station identification input 1000 connects to address book data 1001, stored either on the handset or station itself or on a network location. Address book display 1002 lists all the network addresses or telephone numbers contained in the user's address book in a user-friendly menu or list. The user highlights the desired entry and presses the pound ("#") or asterisk ("*") key on the handset to confirm the selection. Station identification assisted input 1003 transfers the selected network address or telephone number to the ringback replacement system. This obviates the need for manually inputting network addresses, which can be error-prone and time-consuming. The user is returned to the calling system at branch stage 1004.

Figure 11:
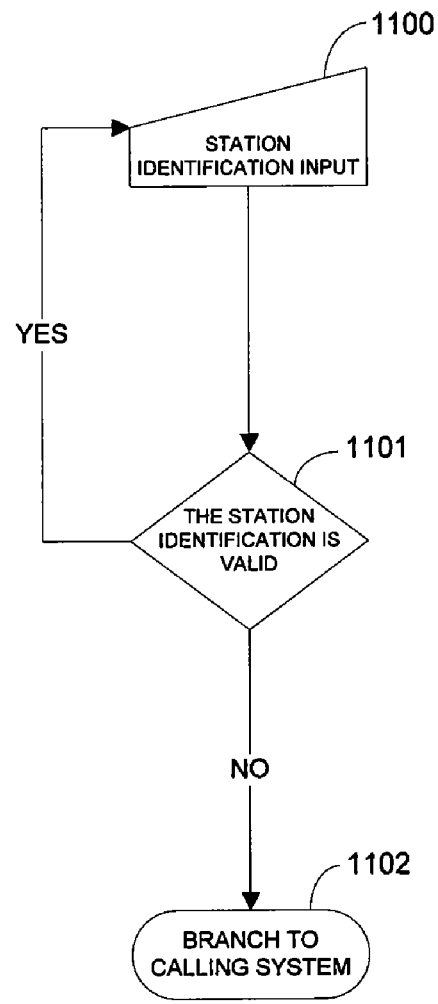
FIG. 11 is a flow diagram illustrating the interaction between a user and the replacement ringback system for selecting more than one network address.

An alternative embodiment of the invention, depicted in FIG. 11, allows a sequence of more than one network address to be entered at station identification 1100. The user, the network provider, or a third party enters a first network address at station identification input 1100, followed by the pound ("#") or asterisk ("*") key, and then enters another network address followed by the pound ("#") or asterisk ("*") key. Any mode of entering the network address common in the art may be utilized in alternate embodiments, and termination keys pound ("#") and asterisk ("*") may not be required. The station identification is verified at station identification validation stage 1101, and, if valid, the user is returned to station identification input 1100 so that additional network addresses may be entered. The user continues this process until satisfied with the sequence and then presses the pound ("#") or asterisk ("*") key twice in succession to signal the conclusion of the network address input stage. This process effectively creates a group membership list, which may be named and saved by the user on the user's handset or station (or a network location) for potential future use. An invalid entry causes station identification validation stage 1101 to return the user to the calling system at branch stage 1102. In addition, a user may enter a wildcard character (e.g., the number 0) to match all network addresses.

Figure 12:
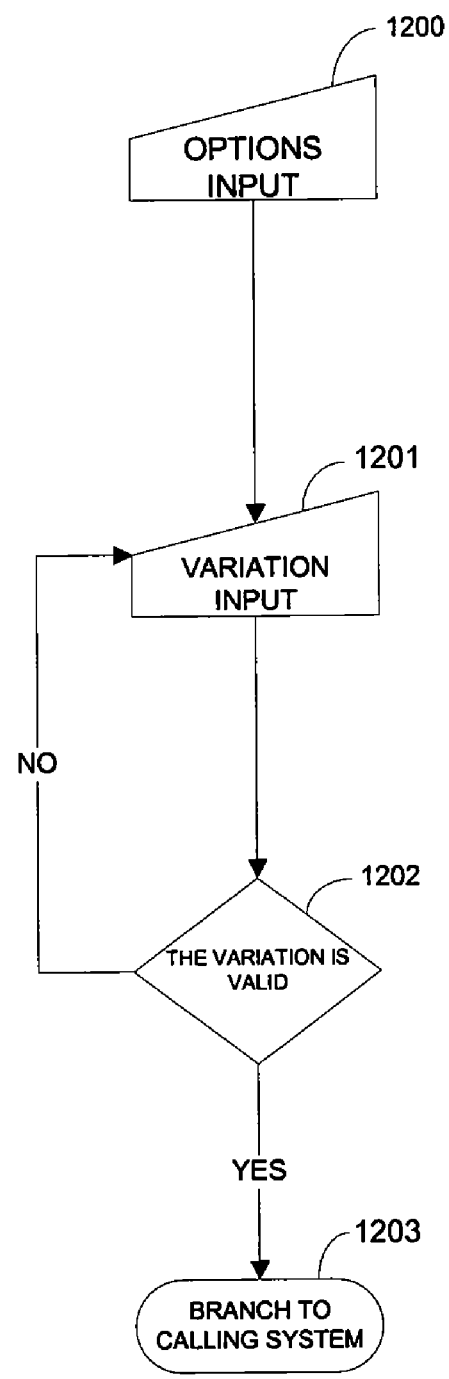
FIG. 12 is a flow diagram illustrating the interaction between a user and the replacement ringback system for selecting a ringback playback variation.

In yet another embodiment of the invention, the user, the network provider, or a third party is presented with additional playback options as depicted in FIG. 12. Options input 1200 is supplemented with variations input 1201 for the user to specify certain variations on how the ringback content is presented to the calling party. For example, the user can press the number "1" on the handset keypad to denote that only the replacement ringback should be played; number "2" to denote the playing of a single conventional ringback tone followed by the replacement ringback content; and, number "3" to denote the playing of the conventional ringback tone under the replacement ringback content (i.e. a blended conventional and replacement ringback tone). For example, the user enters the desired selection—"1", "2", or "3"—via the keypad on the user's handset or station at variation input 1201. The variation selection is validated by variation validation stage 1202. Certain ringback content may not be eligible for certain variation options (e.g., an interactive game may not be available to be played under a conventional ringback tone since the conventional ringback tone might interrupt the functionality of the game). These announcements are deemed invalid and the user is returned to variation input 1201 so that a valid variation input may be selected. Once a valid variation option is selected, the user is returned to the calling system at branch stage 1203.

Figure 13:
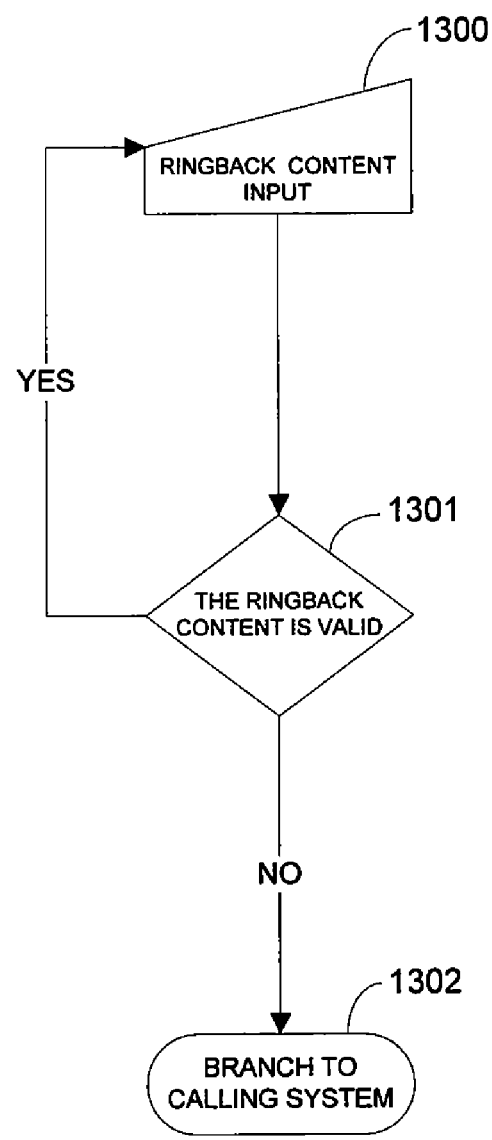
FIG. 13 is a flow diagram illustrating the interaction between a user and the replacement ringback system for creating an album of ringback announcements to be played by the replacement ringback system.

An additional embodiment of the invention allows a sequence of more than one ringback announcement to be selected as depicted in FIG. 13. At ringback content input 1300, the user, the network provider, or a third party enters a first ringback identification alphanumeric, followed by the pound ("#") or asterisk ("*") key and then enters another ringback identification alphanumeric followed by the pound ("#") or asterisk ("*") key. Each alphanumeric is verified by ringback validation stage 1301, and the user continues this process until satisfied with the sequence. The user either presses the pound ("#") or asterisk ("*") key twice in succession or selects an invalid ringback content to signal the conclusion of the ringback content input. The user is then returned to the calling system at branch stage 1302. This embodiment allows the user to create an "album" of ringback content for the purpose of cycling through the album sequence when replacing a call progress signal. For example, a user might select all the music songs from a particular music album by a certain artist. Each time the caller identified by the appropriate network address calls the user, a new song from the designated album is delivered to the user until all selected songs are delivered, at which point the album begins again. In another example, a user may specify a collection of news articles in a certain category, like sports headlines. Each time the caller identified by the appropriate network address calls the user, an unheard sports headline is delivered to the user until all headlines are delivered, at which point the news album begins again.

Figure 14:
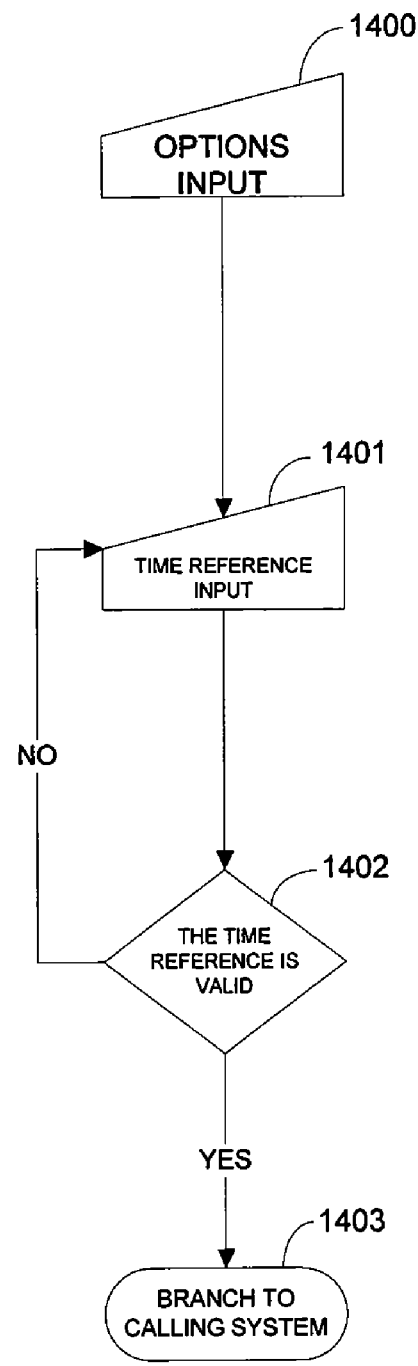
FIG. 14 is a flow diagram illustrating the interaction between a user and the replacement ringback system for associating a time reference with a ringback association; and, FIG. 15 is a flow diagram illustrating the interaction between a user and the replacement ringback system for associating a network or geographic location with a ringback association.

Another embodiment utilizes the clock located within or synchronized with the message generator for the user to select a time reference or window for the playing of replacement content. Options input 1400 is supplemented by time reference input 1401 of FIG. 14, where the user, the network provider, or a third party specifies the time of day, day of week, day of month, month of year, or some other time reference (e.g., absolute time measure from present time) to deliver the corresponding announcement. The time reference or window is verified at validation stage 1402, and if the time reference is deemed invalid (e.g., the time format is incorrect or otherwise invalid), the user is returned to time reference input 1401. Simple logic within the message generator or the network signaling system service node requires the additional matching of the selected time reference or window in addition to the correct network address; however, if a wildcard network address is selected as the station identification for the association, the time reference or window will serve to deliver replacement ringback content to all callers based only on the selected time reference. For example, this allows for a simple way to deliver the same ringback content to all callers calling during a specified time (e.g., midnight through 8 am when the user is typically asleep). The user is then returned to the calling system at branch stage 1403.

Figure 15:
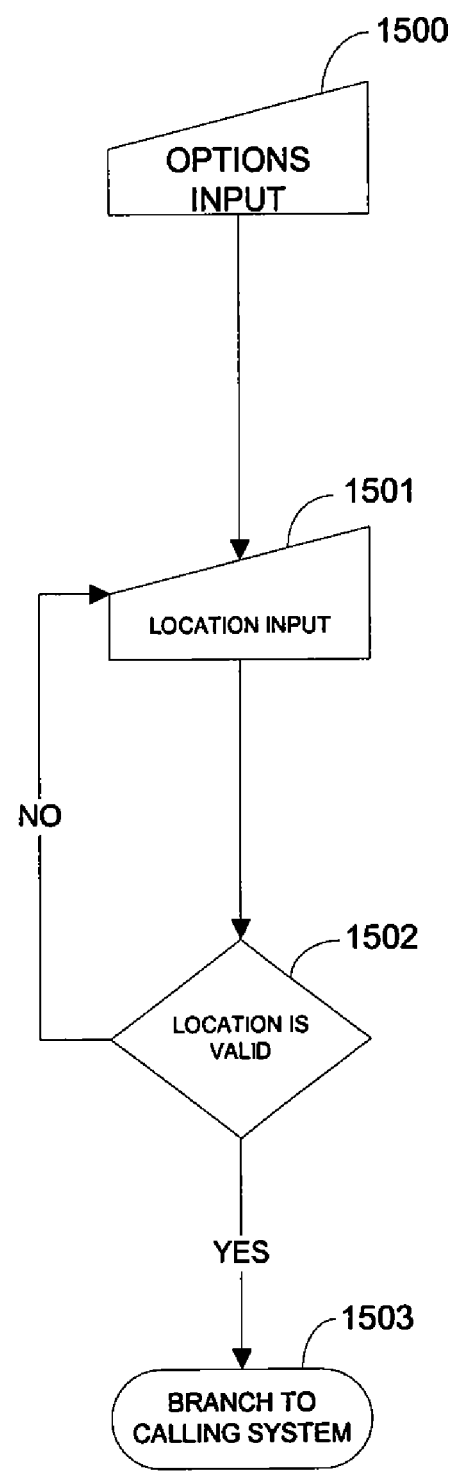

Another embodiment utilizes the updateable look-up table linked to the message generator for a user, the network provider, or a third-party to specify geographic or network location data for the playing of replacement content. Options input 1500 is supplemented by location input 1501 of FIG. 15, where the user specifies a network or geographic location for the delivery of the custom announcement. For example, if the network comprises a telephone network, the location data may include an area code (e.g., "212") or an area code-plus-telephone number prefix (e.g., "212-555-"). The replacement association matches all callers within the specified area code or area code-plus-telephone number prefix. This allows for the delivery of custom ringback content to an entire geographic region (e.g., New York City) based on network address or telephone number. The location data may also comprise a domain name, domain prefix, domain suffix (e.g., ".edu" for all educational users), numeric network IP address and subnet mask, or any other discriminating network address value. The location input is verified at validation stage 1502, and if the location data is deemed invalid (e.g., the location format is incorrect or otherwise invalid), the user is returned to location input 1501 to resubmit valid location data. After a valid entry, the user is returned to the calling system at branch stage 1503.

From the foregoing description of the preferred embodiments, which embodiments have been set forth in considerable detail for the purpose of making a complete disclosure of the invention, it can be seen that the invention comprises a system for delivering uniform ringback content on behalf of subscribers across various network communication services. It will be appreciated by those skilled in the art that changes could be made to the embodiment described above without departing from the broad inventive concept thereof. It is understood, therefore, that this invention is not limited to the particular embodiment disclosed, but it is intended to cover all modifications that are within the scope and spirit of the invention as defined by the appended claims.

The invention claimed is:

1. A system for customizing a communications network, said system comprising:
   a first communications station associated with a calling party;
   a second communications station associated with a called party;
   a storage device containing at least one announcement;
   a ringback system for receiving information regarding a first proximity location of said first communications station and for receiving information regarding a second proximity location of said second communications station; and
   a communications device for initiating a forked or forwarded call to locate said called party at said second communications station;
   wherein said forked or forwarded call is initiated by said calling party,
   wherein said system determines whether said first proximity location is associated with at least one announcement of said plurality of announcements, and
   wherein said system replaces at least a portion of a call signal with at least a portion of said at least one announcement upon a positive determination that said at least one announcement is associated with said first proximity location,
   wherein said at least one announcement is played to said calling party after said initiation of said forked or forwarded call,
   wherein said ringback system determines that said at least one announcement is associated with said first proximity location,
   wherein said at least one announcement is chosen by said called party and is associated with a telephone number of said calling party,
   wherein said portion of said call signal is replaced after said initiation of said forked or forwarded call but prior to active communication with said called party, and
   wherein said call signal is selected from a group consisting of ringback signals, busy signals, network redirect signals, call progress signals, network announcement signals, and dial tone signals.

2. The system as defined in claim 1, wherein said at least one announcement is prerecorded.

3. The system as defined in claim 1, wherein said at least one announcement is live.

4. The system as defined in claim 1, wherein said at least one announcement comprises audio.

5. The system as defined in claim 1, wherein said at least one announcement comprises video.

6. The system as defined in claim 1, wherein said at least one announcement comprises data.

7. The system as defined in claim 1, wherein said at least one announcement comprises an interactive game.

8. The system as defined in claim 1, wherein said at least one announcement comprises an album of related announcements.

9. The system as defined in claim 1, wherein said at least one announcement comprises advertising.

10. The system as defined in claim 1, wherein said at least one announcement comprises programming material.

11. A system for customizing a communications network, said system comprising:
    a first communications station associated with a calling party;
    a second communications station associated with a called party;
    a ringback system for receiving information regarding a first proximity location of said first communications station and for receiving information regarding a second proximity location of said second communications station; a storage device containing at least one announcement; and
    a communications device for initiating a forked or forwarded call to locate said called party at said second communications station;
    wherein said forked or forwarded call is initiated by said calling party, and
    further wherein at least a portion of a call signal is replaced with at least a portion of said at least one announcement, and
    further wherein said at least one announcement is played to said calling party after said initiation of said forked or forwarded call,
    wherein said ringback system determines that said at least one announcement is associated with said first proximity location,
    wherein said at least one announcement is chosen by said called party and is associated with a telephone number of said calling party, and
    further wherein said portion of said call signal is replaced after said initiation of said forked or forwarded call but prior to active communication with said called party,
    wherein said information regarding a second proximity location is transmitted to said first communications station prior to said active communication with said called party,
    wherein said second communications station is selected from the group consisting of a telephone, a wireless telephone, a cellular telephone, a video telephone, a mobile computer, a personal digital assistant, and a multimedia handset.

12. The system as defined in claim 11, wherein said first and said second communications station is part of a communications network.

13. The system as defined in claim 11, wherein said communications device comprises a communications station.

14. The system as defined in claim 11, wherein said communications device comprises a communications network.

15. The system as defined in claim 11, wherein said communications device comprises a gateway.

16. The system as defined in claim 11, wherein said communications device comprises a proxy server.

17. The system as defined in claim 11, wherein said second communications station comprises an integrated display unit featuring a menu system.

18. The system as defined in claim 17, wherein said menu system displays announcements available from said communications network.

19. The system as defined in claim 17, wherein said menu system displays announcements available from said communications device.

20. The system as defined in claim 17, wherein said menu system displays stored network addresses.

21. A system for customizing a communications network, said system comprising:
- a first communications station associated with a calling party;
- a second communications station associated with a called party;
- a storage device containing a plurality of announcements; and
- a communications device for initiating a forked or forwarded call to locate said called party at said second communications station;
- wherein said forked or forwarded call is initiated by said calling party,
- wherein said system receives information regarding a first proximity location of said first communications station and receives information regarding a second proximity location of said second communications station,
- wherein said system determines whether said first proximity location is associated with at least one announcement of said plurality of announcements, and
- wherein said system replaces at least a portion of a call signal with at least a portion of said at least one announcement upon a positive determination that said at least one announcement is associated with said first proximity location,
- further wherein said at least a portion of said at least one announcement is played to said calling party after said initiation of said forked or forwarded call,
- wherein said at least one announcement is chosen by said calling party and is associated with a telephone number of said calling party,
- wherein said at least a portion of said call signal is replaced after said initiation of said forked or forwarded call but prior to active communication with said called party, and
- wherein said communications network is selected from the group consisting of a circuit-switched network, a packet-based network, the Internet, a local area network, a wide area network, a virtual private network, a metropolitan area network, a broadcast network, a wireless network, and a cellular network.

22. The system as defined in claim 21, wherein said second communications station accesses said system via soft keys on said second communications station.

23. The system as defined in claim 21, wherein said second communications station accesses said system via hard keys on said second communications station.

24. The system as defined in claim 21, wherein said second communications station accesses said system via an attachable input device.

25. The system as defined in claim 21, wherein said second communications station accesses said system via a voice recognition module.

26. A method for replacing at least a portion of a call signal with at least a portion of an announcement, comprising:
- placing a call by a calling party from a first communications device;
- locating a second communications device via a forked or forwarded call;
- accessing a storage device containing at least one announcement of a plurality of announcements;
- playing at least a portion of said at least one announcement to said first communications device as a call signal; and
- terminating the playing of said at least a portion of said at least one announcement to said first communications device;
- receiving, via a communication device, information regarding a first proximity location of said first communications device and receiving information regarding a second proximity location of said second communications device,
- wherein said communication device determines whether said first proximity location is associated with at least one announcement of said plurality of announcements, and
- wherein said communication device replaces at least a portion of a call signal with at least a portion of said at least one announcement upon a positive determination that said at least one announcement is associated with said first proximity location,
- wherein said at least one announcement is chosen by said called party and is associated with a telephone number of said calling party,
- wherein said at least a portion of said at least one announcement is played after the placing of the call but prior to active communication with the second communications device, and
- wherein said call signal is selected from the group consisting of ringback signals, busy signals, network redirect signals, call progress signals, network announcement signals, and dial tone signals.

27. The method as defined in claim 26, wherein said at least one announcement is prerecorded.

28. The method as defined in claim 26, wherein said at least one announcement is live.

29. A method for customizing a communications network, said method comprising the steps of:
- establishing communication with a system capable of replacing at least a portion of a call signal with at least one announcement, wherein said at least one announcement is selected from the group consisting of audio, video, data, and a combination of audio, video, or data;
- accessing a storage device containing said at least one announcement;
- associating a first geographical location with said at least one announcement;
- determining a second geographical location of a communications device;
- delivering at least a portion of said at least one announcement as a call signal while a communications device is located via a forked or forwarded call,
- wherein said at least a portion of said at least one announcement is delivered if said first geographical location matches said second geographical location;
- wherein said at least one announcement is chosen by said called party and is associated with a telephone number of said calling party; and
- wherein said at least a portion of said at least one announcement is delivered after establishing the communication with said system but prior to active communication with the communications device.

30. The method as defined in claim 29, wherein the call signal is selected from the group consisting of ringback signals, busy signals, network redirect signals, call progress signals, network announcement signals, and dial tone signals.

31. The method as defined in claim 29, wherein said at least one announcement is prerecorded.

32. The method as defined in claim 29, wherein said at least one announcement is live.

33. The method as defined in claim 29, wherein said system is accessed after successful completion of an authorization routine.

34. The method as defined in claim 33, wherein said authorization routine verifies a subscription status of a user.

35. The method as defined in claim 34, wherein said authorization routine allows said user to subscribe to a network service.

* * * * *